United States Patent [19]
Hurst et al.

[11] Patent Number: 6,131,123
[45] Date of Patent: Oct. 10, 2000

[54] EFFICIENT MESSAGE DISTRIBUTION TO SUBSETS OF LARGE COMPUTER NETWORKS USING MULTICAST FOR NEAR NODES AND UNICAST FOR FAR NODES

[75] Inventors: Stephen A. Hurst, Nashua, N.H.; Radia J. Perlman, Acton, Mass.

[73] Assignee: Sun Microsystems Inc., Palo Alto, Calif.

[21] Appl. No.: 09/079,505

[22] Filed: May 14, 1998

[51] Int. Cl.$^7$ .................................................. G06F 13/00
[52] U.S. Cl. ......................................................... 709/238
[58] Field of Search ....................... 364/DIG. 1, DIG. 2; 709/200, 206, 207, 218, 232, 235, 238

[56] References Cited

U.S. PATENT DOCUMENTS 5,519,704   5/1996   Farinacci et al. ..................... 370/85.13

OTHER PUBLICATIONS

Marzo, et al. "Multicast Algorithms Evaluation Using an Adaptive Routing in ATM Networks," The Institution of Electrical Engineers, XP002115044, London.

*Primary Examiner*—Robert B. Harrell
*Attorney, Agent, or Firm*—James D. Ivey

[57] ABSTRACT

A computer sends a message to each of a number of recipient computers of a computer network by sending the message as a multicast message to near ones of the recipient computers and sending the message as unicast messages to far ones of the recipient computers. The sending computer determines the circumstances under which a combination of multicast and unicast messages are efficient by determining that many recipient computers are near the sending computer and that few recipient computers are far. The sending computer makes such a determination by determining no more than a predetermined number of recipient computers are at least a predetermined distance further from the sending computer than are the others of the recipient messages. The sending computer can also determine that the burden imposed upon the computer network by a multicast message is justified by the need to deliver the message to its intended recipients. For intended recipients which are too far and too few to justify use of a multicast message, unicast messages are sent.

39 Claims, 6 Drawing Sheets

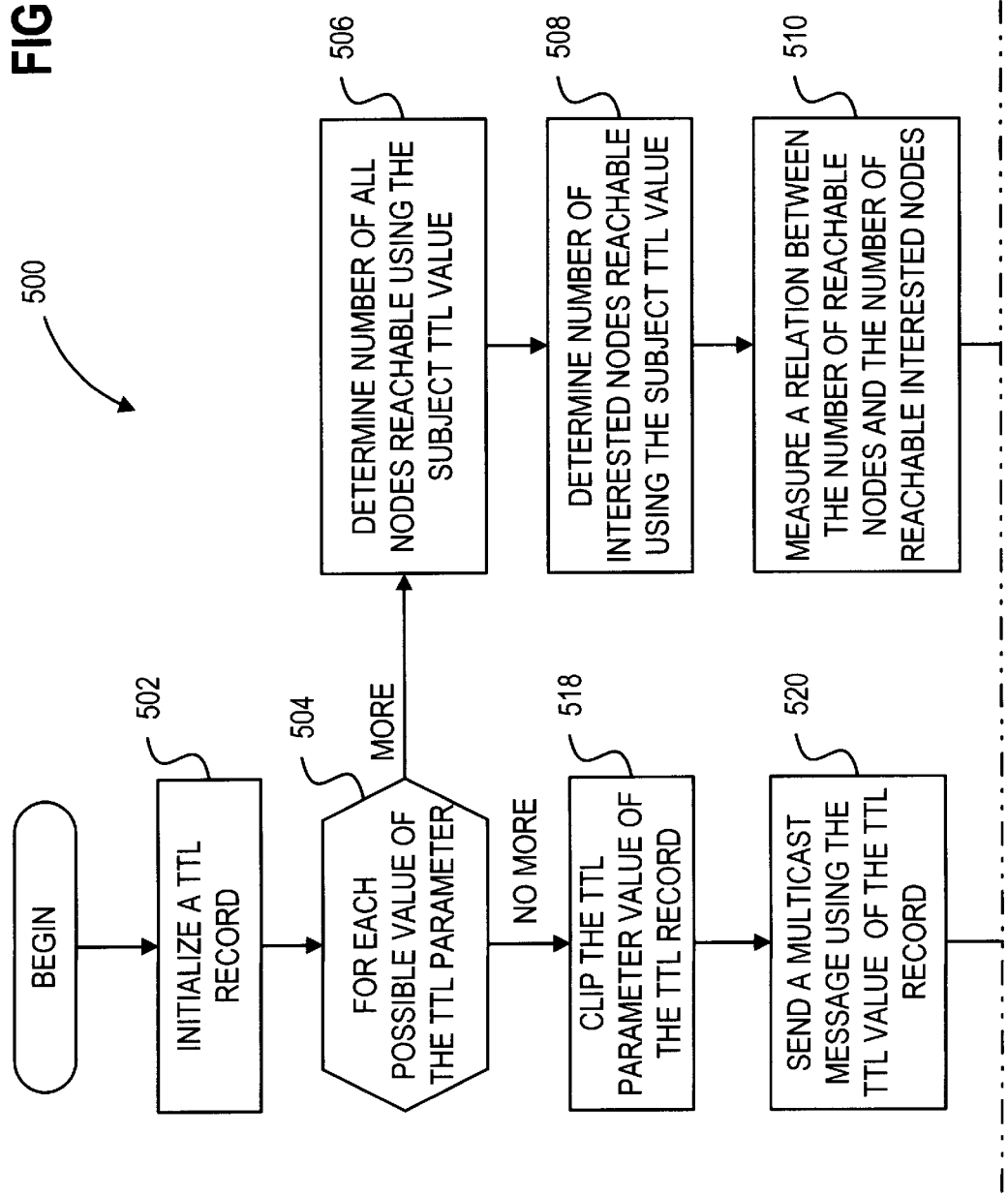

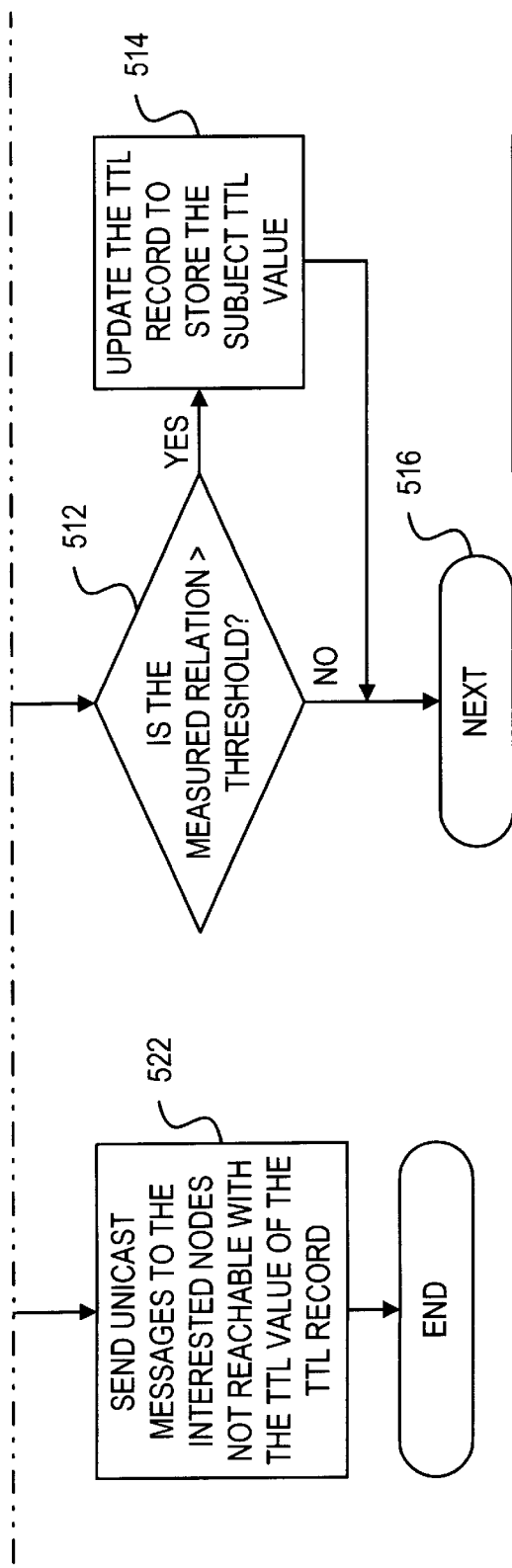

EFFICIENT MESSAGE DISTRIBUTION TO SUBSETS OF LARGE COMPUTER NETWORKS USING MULTICAST FOR NEAR NODES AND UNICAST FOR FAR NODES

FIELD OF THE INVENTION

The present invention relates to computer networks and, in particular, to a particularly effective mechanism for distributing messages to a subset of a computer network while minimizing message traffic through the computer network.

BACKGROUND OF THE INVENTION

Networks of computer systems are ubiquitous in our society and such networks range in size from two-computer local area networks to wide area networks which include thousands of computers and which span the entire world. It is frequently desirable to send a message to many other computers of a computer network.

Multicasting is a mechanism by which a relatively low number of messages can be used to convey a message to many computers of a computer network. Consider, for example, computer network 100 shown in FIG. 1. Suppose computer 102A has a message to send to all computers 102B–CC of computer network 100. Through multicast, computer 102A forms a single copy of the message and sends the message to computers 102B–D to which computer 102A is directly coupled through computer network 100 as shown. Computer 102D recognizes the message as multicast and forms additional copies to send to computers 102E–H, to which computer 102D is directly coupled through computer network 102D as shown. Similarly, computer 102H forwards copies of the message to computers 102J–L, and the message is propagated through computer network 100 to all of computers 102B–CC.

Unicast is a messaging protocol in which each message has an intended recipient. Using unicast to send a message from computer 102A to computers 102B–CC involves twenty-six separate messages transmitted through the portion of computer network 100 between computers 102A and 102D. By comparison, multicast transmits a single message through the same portion of computer network 100. The efficiency of multicast relative to unicast is relatively modest in this illustrative example in comparison to multicast messages through wide-area networks which include thousands of computers.

It is frequently desirable to send messages to a local portion of a wide-area network. Messages therefore include a time-to-live (TTL) parameter which establishes a condition for expiration of a multicast message. The TTL parameter of a multicast message is initialized by the sending computer and is decreased by each computer which forwards the multicast message. In some networks, the TTL parameter of a multicast message is decremented, i.e., decreased by one, by each computer which forwards the message such that the TTL parameter specifies an expiration condition in terms of network hops. In other networks, each computer which forwards a message decreases the TTL parameter of the message by an amount of time required to transfer the message to the computer such that the TTL parameter specifies an expiration condition in terms of an amount of time the message is permitted to travel. Some of the latter networks require that each computer decrease the TTL parameter by at least one second such that the TTL parameter specifies an expiration condition in terms of a combination of a maximum number of network hops and a maximum amount of time. When the TTL parameter of a multicast message is decreased below a predetermined threshold, which is typically zero, the multicast message is destroyed. The following example is illustrative.

Suppose computer 102A wishes to send a multicast message to computers 102B–G. Computer 102A can form a multicast message with a TTL parameter whose value is two. The message reaches computers 102B–D since computers 102B–D are coupled directly to computer 102A through computer network 100. Computer 102D decrements the TTL parameter of the message to have a value of one and forwards the multicast message to computers 102E–H. Thus, computers 102B–G receive the multicast message. In addition, computer 102H receives the multicast message. Computer 102H decrements the TTL parameter of the multicast message to have a value of zero. Accordingly, computer 102H destroys the multicast message. As a result, the multicast message does not pass beyond computer 102H and does not unnecessarily burden the remainder of computer network 100.

It is sometimes desirable to send a message to a subset of a computer network in which most of the nodes of the subset are relatively close to the node sending the message and a few are relatively far from the sending node. In such situations, multicast messages reach too far into the computer network such that nodes which do not need to receive the message nonetheless do and must also route the message. Accordingly, unintended recipients of the message have more message traffic than necessary. Conversely, unicast messages have the above-described inefficiencies with respect to message redundancy for relatively close recipient nodes.

Consider, for example, a message which computer 102A sends to computers 102B–G and 102X. Sending the message as a unicast message involves sending seven nearly identical messages through the portion of computer network 100 between computers 102A–D. Such is a relatively significant burden upon that portion of computer network 100. Sending the message as a multicast message involves sending a multicast message with a TTL parameter whose value is sufficiently large to reach the furthest intended recipient node, i.e., computer 102X in this illustrative example. Such reduces the amount of traffic between computers 102A–D since a single message is sent through that portion of computer network 100. However, the multicast message reaches significantly beyond computer 102X. In this illustrative example, the multicast message reaches all of computers 102B–CC since all of computers 102B–CC can be reached by a multicast message with a TTL parameter sufficiently large that the message can reach computer 102X. Accordingly, computers 102M–Q and 102Z–CC receive the multicast message unnecessarily since none of those computers connect computer 102A to any recipient computer.

What is needed is a mechanism by which computers of a computer network can efficiently distribute messages to other computers of the computer network without requiring excessive message traffic throughout the computer network.

SUMMARY OF THE INVENTION

In accordance with the present invention, a computer sends a message to each of a number of recipient computers of a computer network by sending the message as a multicast message to near ones of the recipient computers and sending the message as a unicast message to far ones of the recipient computers. If many of the recipient computers are relatively near the sending computer, a single multicast message with a relatively low TTL parameter reaches the near recipient computers with the advantageous efficiencies of multicast messages and without sending the message along paths through the network which do not lead to other recipient computers. If a few of the recipient computers are relatively far from the sending computer, sending a multicast message to the far recipients would flood the message along paths not leading to recipient computers. For example, a multicast message from computer 102A to computer 102X would reach computers 102Z–BB as well. However, by sending a unicast message to each of the few far recipient computers requires a few messages along only those paths of the computer network which lead to recipient computers.

As a result, parts of the computer network near the sending computer are not flooded with numerous unicast messages since only a few unicast messages are sent and a single multicast message is sent to near recipients. In addition, relatively distant computers which are not along network paths which do not lead to a recipient computer do not receive the message at all and therefore can use the available network bandwidth for other messages.

Further in accordance with the present invention, the sending computer determines the circumstances under which a combination of multicast and unicast messages are efficient by determining that many recipient computers are near the sending computer and that few recipient computers are far. The sending computer makes such a determination by determining no more than a predetermined number of recipient computers are at least a predetermined distance further from the sending computer than are the others of the recipient messages. For example, the sending computer can determine that a combination of multicast and unicast messages is efficient when no more than ten (10) recipient computers are twice as far from the sending computer as are the remainder of the recipient computers. Under such circumstances, significant improvements in message routing efficiency through the computer network can be realized by sending the message as a unicast message to each of the far recipient computers and sending the message as a multicast message to the remaining recipient computers. In particular, limiting the number of far recipient computers limits the workload of the sending computer in processing multiple unicast messages. In addition, limiting the use of unicast messages to recipient computers which are at least a predetermined distance further than the remainder of the recipient computers ensures that the inefficiency of unicast messages outweighs the burden upon the computer network by extending the TTL parameter of a multicast message to reach the far recipient computers.

BRIEF DESCRIPTION OF THE DRAWINGS

FIG. 5 is a logic flow diagram of the sending of a message by the computer system of FIG. 2 to each of a number of computers consistent with an alternative embodiment of the present invention.

DETAILED DESCRIPTION

In accordance with the present invention, computer 102A (FIG. 1) sends a message 214 (FIG. 2) to each of a number of intended recipient computers of computer network 100. If a few of the recipient computers are far from computer 102A relative to the other recipient computers, computer 102A sends message 214 to the far recipient computer as a number of unicast messages and sends message 214 to the other recipient computer systems as a multicast message. In the example given above in which computer 102A is to send message 214 to computers 102B–G (FIG. 1) and 102X, computer 102A sends a multicast message with a TTL parameter whose value is sufficiently large to reach computers 102B–G and a unicast message to computer 102X. As a result, the multicast message reaches computers 102B–H, and the unicast message travels from computer 102A, through computers 102D, 102K, 102L, 102S, 102U, and 102V, to computer 102X. As a result, computers 102Z–BB do not receive the message and are therefore not unnecessarily burdened with the message. In addition, only two copies of message 214 travel through the portion of computer network 100 between computers 102A–D, and the amount of traffic through that portion of computer network 100 is substantially reduced in comparison to the sending of seven, nearly identical unicast messages.

Figure 1:
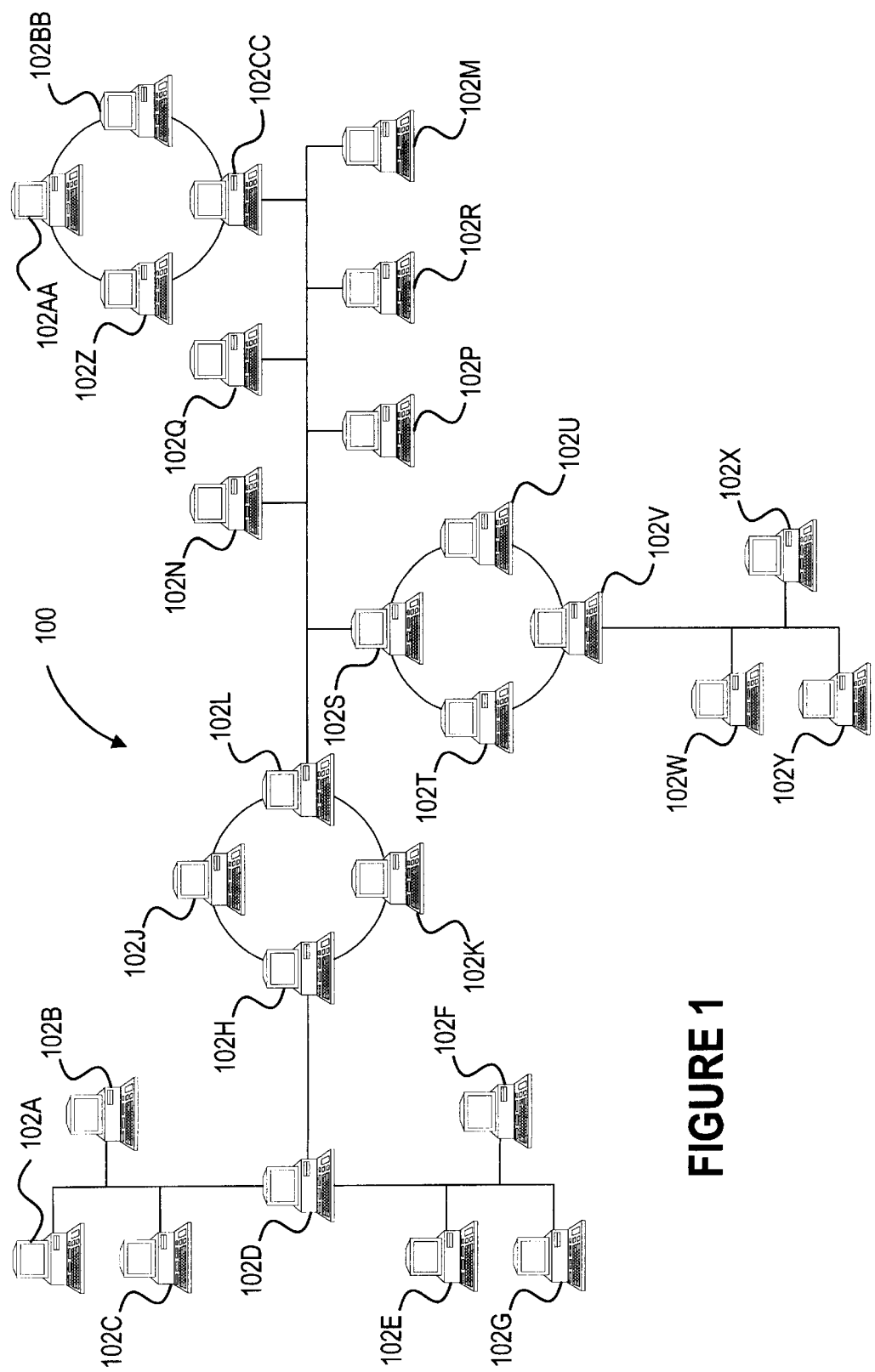
FIG. 1 is a computer network through which messages are distributed to selected recipient computers consistent with the present invention.
Figure 2:
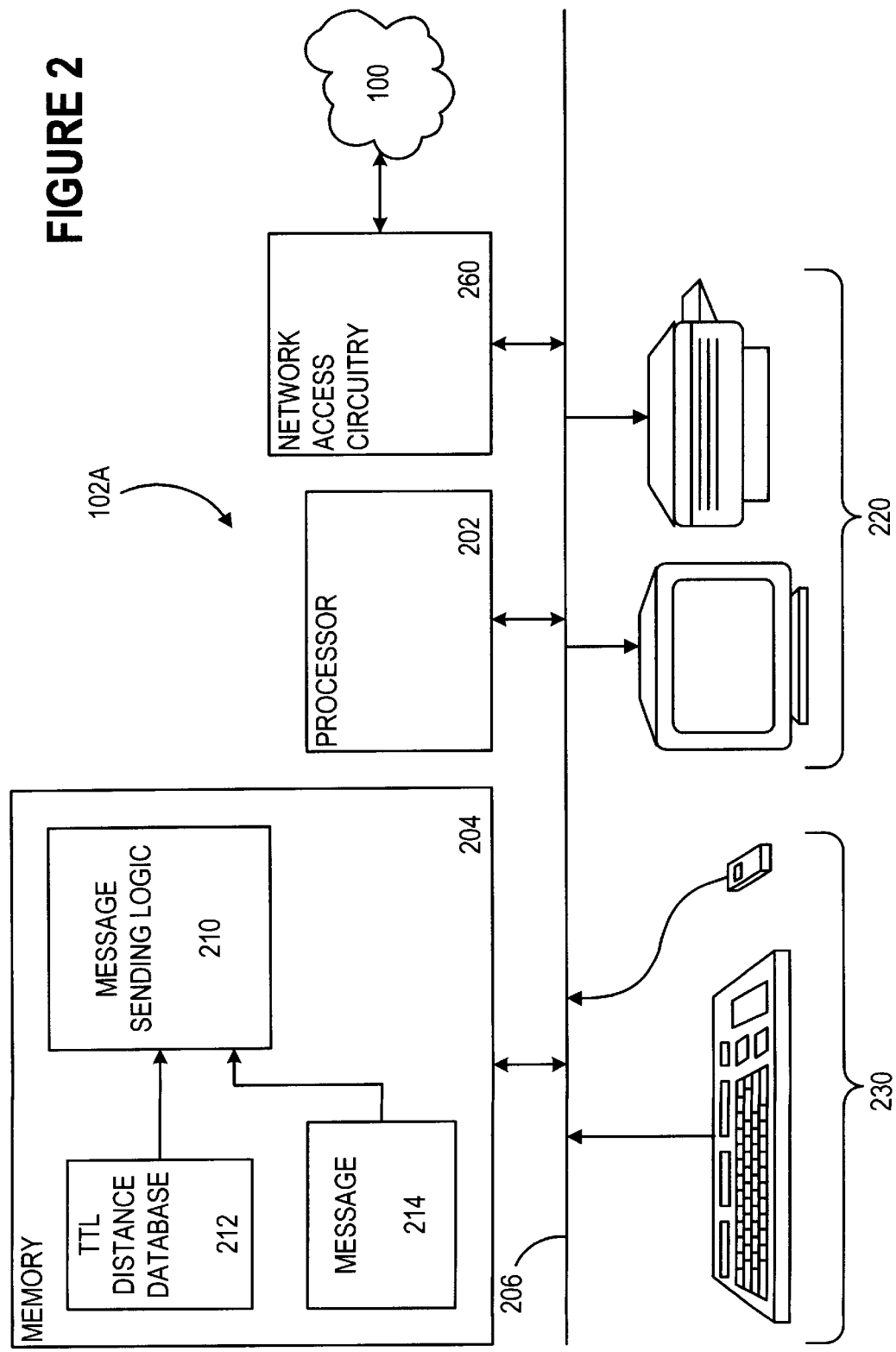
FIG. 2 is a block diagram of a sending computer system which sends a message to selected recipient computers of the computer network of FIG. 1 consistent with the present invention.

Computer system 102A is shown in greater detail in FIG. 2. Computers 102A–CC (FIG. 1) are generally analogous to one another and the following description of computer 102A is equally applicable to each of computers 102B–CC. In addition, computers 102A–CC are all nodes of computer network 100.

Computer 102A has a generally conventional architectural design which is known but is described herein for completeness. Computer 102A includes a processor 202 (FIG. 2) and memory 204 which is coupled to processor 202 through an interconnect 206. Interconnect 206 can be generally any interconnect mechanism for computer system components and can be, e.g., a bus, a crossbar, a mesh, a torus, or a hypercube. Processor 202 fetches from memory 204 computer instructions and executes the fetched computer instructions. In addition, processor 202 can fetch computer instructions through computer network 100 through network access circuitry 260 such as a modem or ethernet network access circuitry. Processor 202 also reads data from and writes data to memory 204 and sends data and control signals through interconnect 206 to one or more computer display devices 220 and receives data and control signals through interconnect 206 from one or more computer user input devices 230 in accordance with fetched and executed computer instructions.

Memory 204 can include any type of computer memory and can include, without limitation, randomly accessible memory (RAM), read-only memory (ROM), and storage devices which include storage media such as magnetic and/or optical disks. Memory 204 includes message sending logic 210 which is all or part of one or more computer processes which in turn execute within processor 202 from memory 204. A computer process is generally a collection of computer instructions and data which collectively define a task performed by a computer such as computer 102A. Memory 204 also includes a TTL distance database 212 and message 214.

Each of computer display devices 220 can be any type of computer display device including without limitation a printer, a cathode ray tube (CRT), a light-emitting diode (LED) display, or a liquid crystal display (LCD). Each of computer display devices 220 receives from processor 202 control signals and data and, in response to such control signals, displays the received data. Computer display devices 220, and the control thereof by processor 202, are conventional.

Each of user input devices 230 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 230 generates signals in response to physical manipulation by a user and transmits those signals through interconnect 206 to processor 202.

In one embodiment, processor 202 is an UltraSPARC processor and each of computers 102A–CC are SPARCstation computer systems, both of which are available from Sun Microsystems, Inc. of Palo Alto, Calif. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Message sending logic 210 of computer 102A executes within processor 202 from memory 204 to send messages, e.g., message 214, from computer 102A to computers 102B–Y (FIG. 1) in the manner described more completely below. Message sending logic 210 (FIG. 2) uses TTL distance information which message sending logic 210 retrieves from a TTL distance database 212 which is stored within memory 204.

Message Sending Logic 210

Figure 3:
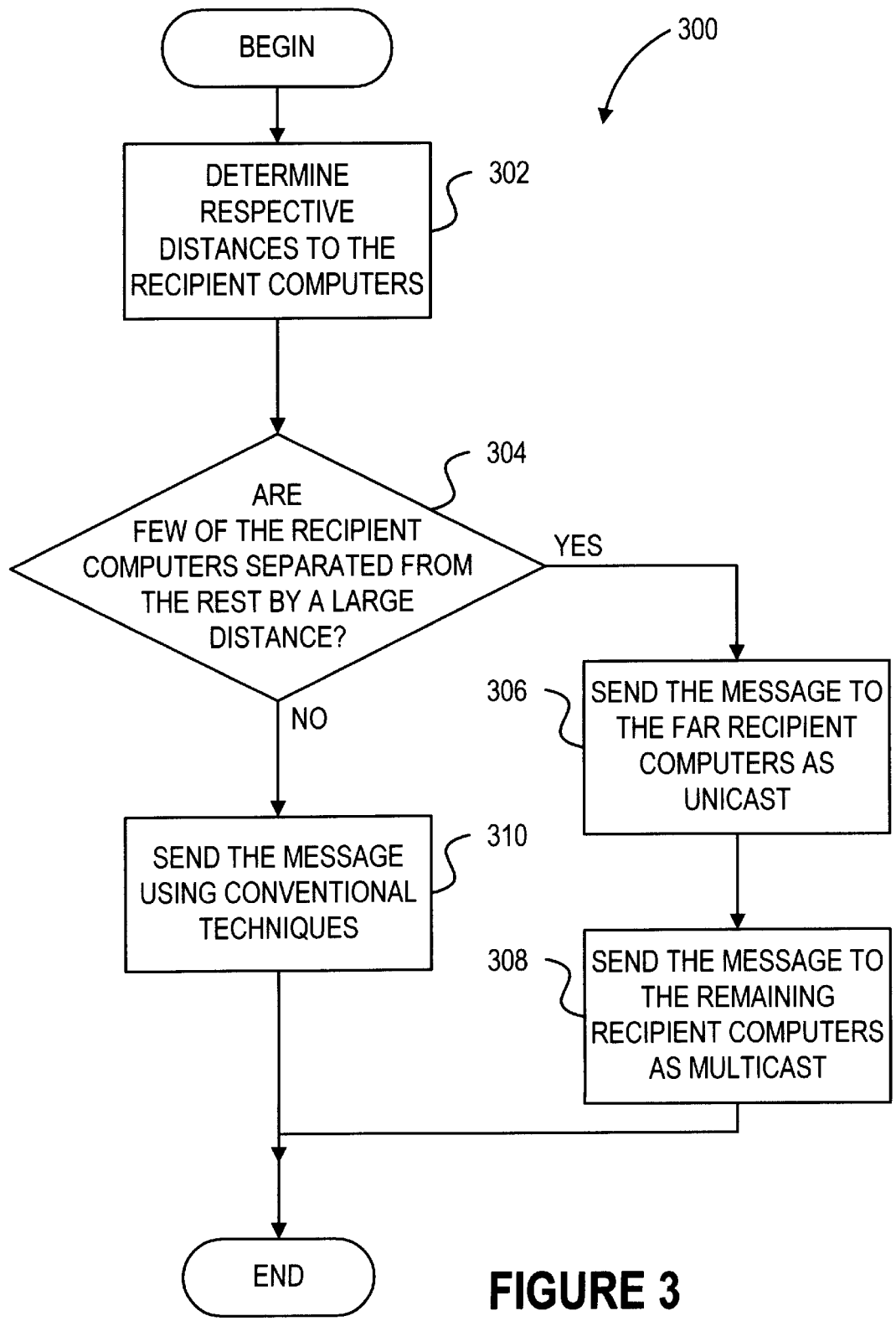
FIG. 3 is a logic flow diagram of the sending of a message by the computer system of FIG. 2 to each of a number of computers consistent with the present invention.

To distribute message 214 to computers 102B–G (FIG. 1) and 102X from computer 102A, message sending logic 210 (FIG. 2) of computer 102A sends message 214 according to logic flow diagram 300 (FIG. 3). In step 302, message sending logic 210 (FIG. 2) determines the respective distances of the recipient computers, e.g., of computers 102B–G (FIG. 1) and 102X.

Message sending logic 210 (FIG. 2) determines the distance to each of the recipient computers by retrieving distance information from TTL distance database 212. TTL distance database 212 is populated with distance information to each of computers 102B–CC (FIG. 1) and such distance information can be determined using conventional techniques. In one embodiment, such distance information is determined in the manner described more completely in co-pending U.S. patent application Ser. No. 09/079,504 by Stephen A. Hurst, Dah Ming Chiu, Stephen R. Hanna, and Radia J. Perlman entitled "Determination of Distance Between Nodes in a Computer Network" filed May 14, 1998, and that description is incorporated herein by reference.

Figure 4:
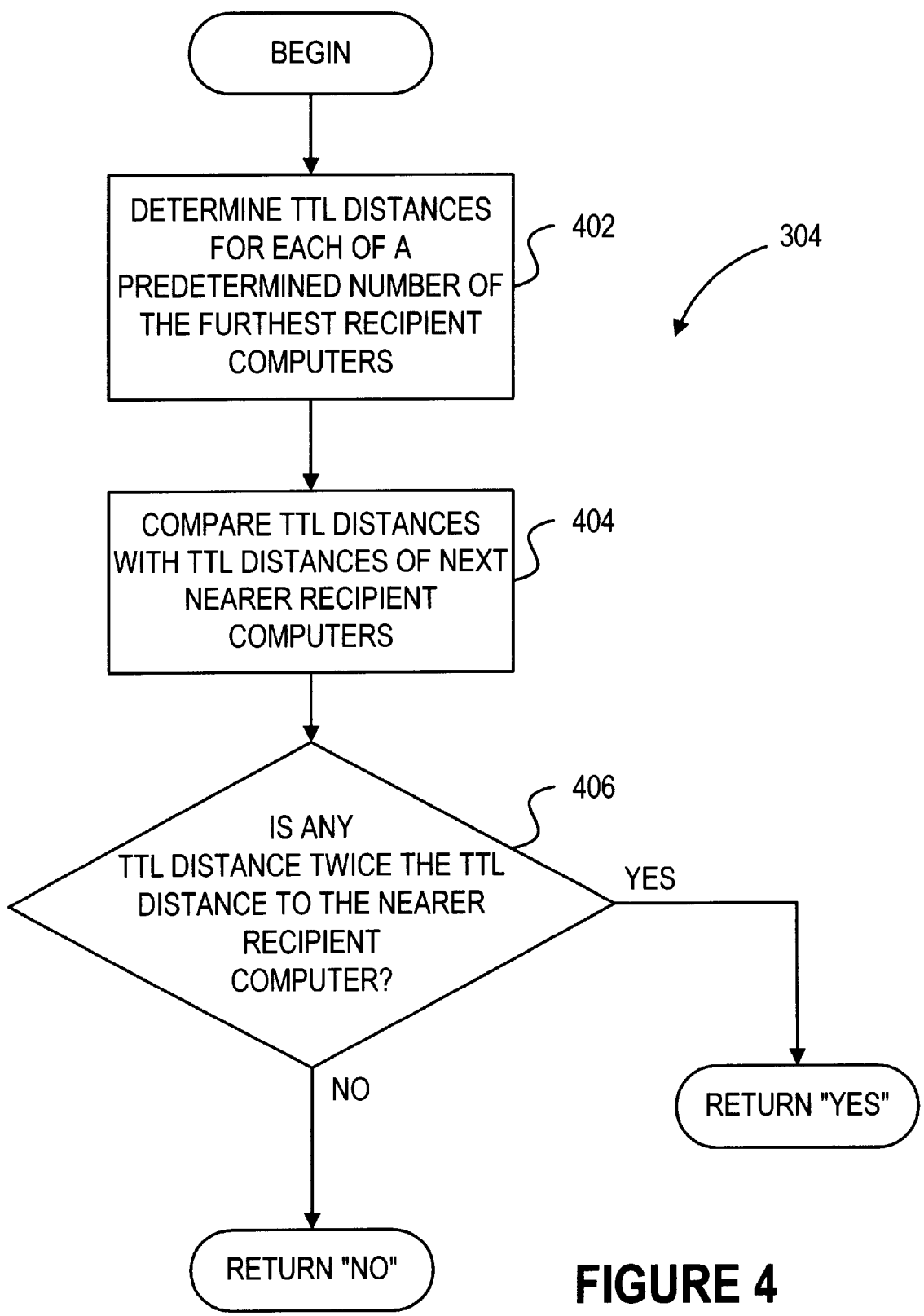
FIG. 4 is a logic flow diagram of the determination by the computer system of FIG. 2 as to whether few of the recipient computers are far from the sending computer consistent with the present invention.

In test step 304 (FIG. 3), message sending logic 210 (FIG. 2) determines whether few of the recipient computers are relatively far from computer 102A within computer network 100 (FIG. 1). Specifically, message sending logic 210 (FIG. 2) determines whether a relatively few number of recipient computers are separated from the other recipient computers by a relatively large gap in TTL distances. Test step 304 (FIG. 3) is shown in greater detail as logic flow diagram 304 (FIG. 4). In step 402, message sending logic 210 (FIG. 2) determines TTL distances of respective ones of a predetermined number of the furthest recipient computers. In one embodiment, the predetermined number is ten (10). In an alternative embodiment, the predetermined number is five (5). The predetermined number represents the maximum number of unicast messages message sending logic 210 is allowed to send in distributing message 214 to a number of recipient computers. Accordingly, the predetermined number should be adjusted according to the particular processing and network bandwidth of computer 102A and other computers of computer network 100 (FIG. 1) through which such unicast message can be sent.

Processing transfers to step 404 (FIG. 4) in which message sending logic 210 (FIG. 2) compares the TTL distances of each of the predetermined number of furthest recipient computers to the TTL distance of the next nearer recipient computer. For example, message sending logic 210 compares the TTL distance of computer 102X to the TTL distance of computer 102G and further compares the TTL distance of computer 102G to the TTL distance of computer 102F and so on.

Processing transfers to test step 406 (FIG. 4) in which message sending logic 210 (FIG. 2) determines whether any TTL distance of the predetermined number of furthest recipient computers is at least a predetermined distance greater than the TTL distance of the next nearer recipient computer. In one embodiment, message sending logic 210 further determines that the TTL distance of the predetermined number of furthest recipient computer is greater than a predetermined minimum threshold. Accordingly, message sending logic 210 determines that a single multicast message is best when, for example, most of the recipient computers have TTL distances of one (1) and a few recipient have TTL distances of two (2), which is at least a predetermined distance greater than the TTL distances of the remaining recipient computers. If one of the TTL distances of the predetermined number of furthest recipient computers (i) is at least a predetermined distance greater than the TTL distance of the next nearer recipient computer and (ii) is at least the predetermined minimum threshold, message sending logic 210 (FIG. 2) determines that few of the recipient computers are separated from the remaining recipient computers by a large distance in test step 304 (FIG. 3). Conversely, if no TTL distance of the predetermined number of furthest recipient computers is both (i) at least a predetermined distance greater than the TTL distance of the next nearer recipient computer as compared in step 404 (FIG. 4) and (ii) at least the predetermined minimum threshold, message sending logic 210 (FIG. 2) determines that few of the recipient computers are not separated from the remaining recipient computers by a large distance in test step 304 (FIG. 3). Thus, message sending logic 210 (FIG. 2) determines whether no more than a predetermined number of the furthest recipient computers are further from computer 102A by at least a predetermined distance greater than the greatest TTL distance of the other recipient computers in test step 304 (FIG. 3).

In one embodiment, the predetermined distance is proportional to the greatest TTL distance of all nearer recipient computers. For example, the predetermined distance, in this illustrative embodiment, is equal to the greatest TTL distance of all nearer recipient computers. As a result, message sending logic 210 (FIG. 2) determines that no more that the predetermined number of furthest recipient computers are further from computer 102A by at least a predetermined distance greater than the greatest TTL distance of the other recipient computers when no more that the predetermined number of furthest recipient computers are further from computer 102A by at least twice the greatest TTL distance of the other recipient computers.

If so, processing transfers from test step 304 to step 306 with is described more completely below. Conversely, if there is no TTL distance of the predetermined number of furthest recipient computers which is greater than twice the TTL distance of the next nearer recipient computer, processing by message sending logic 210 (FIG. 2) proceeds to step 310 (FIG. 3) in which message sending logic 210 (FIG. 2) sends the message to the recipient computers using conventional techniques. For example, message sending logic 210 can send message 214 as a single multicast message with a TTL parameter sufficiently large to reach all intended recipient computers. Alternatively, message sending logic 210 can send message 214 as separate unicast messages to each of the intended recipient computers. After step 310 (FIG. 3), processing according to logic flow diagram 300 by message sending logic 210 (FIG. 2) completes.

In step 306 (FIG. 3), message sending logic 210 (FIG. 2) sends message 214 as a number of separate unicast messages to each of the furthest recipient computers which are at least twice as far from computer 102A than are the remaining recipient computers. In the illustrative example given above, computer 102X (FIG. 1) is further from computer 102A than are computers 102B–G by at least twice the TTL distance of any of computers 102B–G. Accordingly, message sending logic 210 (FIG. 2) sends message 214 to computer 102X as a unicast message.

In step 308 (FIG. 3), message sending logic 210 (FIG. 2) sends message 214 to the other recipient computers, i.e., all recipient computers to which message 214 was not sent in step 306, as a multicast message. In the illustrative example given above, message sending logic 210 (FIG. 2) sends message 214 to computers 102B–G as a multicast message with a TTL parameter sufficient that message 214 can reach all of computers 102B–G.

After step 308 (FIG. 3), processing according to logic flow diagram 300 completes. According to logic flow diagram 300, a single multicast message is sent to those recipient computers near the sending computer to minimize traffic between the sending computer and the near recipient computers and a unicast message is sent to each recipient computer which is separated from the near recipient computers by a large gap to reduce errant traffic throughout the network along paths not leading to intended recipient computers. As a result, sending messages to a subset of a computer network according to logic flow diagram 300 particularly efficiently uses network resources without significant excess.

FIG. 5

Logic flow diagram 500 (FIG. 5) represents the use of multicast and unicast messaging by message sending logic 210 (FIG. 2) in an alternative manner to that shown in logic flow diagram 300 (FIG. 3). In logic flow diagram 500 (FIG. 5), message sending logic 210 (FIG. 2) selects a combination of multicast and unicast messages which strikes a particularly good balance between the burden imposed by unicast messages and the burden imposed by a multicast message traveling too far through computer network 100.

In step 502 (FIG. 5), message sending logic 210 (FIG. 2) initializes a TTL record to represent a TTL parameter value to be used in sending a multicast message to near ones of the intended recipients of message 214. In one embodiment, the initial TTL parameter value stored in the TTL record is one (1).

Loop step 504 and next step 516 define a loop in which each of a number of possible TTL parameter values is processed according to steps 506–514. In one embodiment, each possible TTL parameter value between two (2) and 255 is processed according to steps 506–514 in the loop of steps 504–516. For each possible TTL parameter value processed according to the loop of steps 504–516, processing transfers to step 506. The particular possible TTL parameter value processed in a particular iteration of the loop of steps 504–516 is referred to as the subject TTL parameter value.

In step 506, message sending logic 210 (FIG. 2) determines the number of computers 102B–CC which can be reached by a multicast message with a TTL parameter whose value is the subject TTL parameter value. Such a determination can be made by reference to TTL distance database 212 in the manner described above. The number determined in step 506 (FIG. 5) represents a burden imposed upon the computers of computer network 100 (FIG. 1) by a multicast message with a TTL parameter having a value of the subject TTL parameter value. In step 508 (FIG. 5), message sending logic 210 (FIG. 2) determines the number of interested ones of computers 102B–CC (FIG. 1), i.e., intended recipients of message 214, which can be reached by a multicast message with a TTL parameter whose value is the subject TTL parameter value. The number determined in step 508 (FIG. 5) represents a portion of the burden determined in step 506 which is used to deliver message 214 to intended recipients.

In step 510, message sending logic 210 (FIG. 2) measures a relation between the number of reachable computers and the number of reachable interested computers for the subject TTL parameter value. In one embodiment, the measured relation is a ratio of the number determined in step 506 to the number determined in step 508, i.e., a ratio of the number of computers 102B–CC reachable with the subject TTL parameter value to the number of interested computers 102B–CC reachable with the subject TTL parameter value. In an alternative embodiment, the measured relation is a difference between the number determined in step 506 and the number determined in step 508, i.e., a difference between the number of computers 102B–CC reachable with the subject TTL parameter value and the number of interested computers 102B–CC reachable with the subject TTL parameter value. The relation represents a relation between the burden imposed upon computer network 100 (FIG. 1) by a multicast message whose TTL parameter has the subject TTL parameter value and that portion of the burden which is needed to deliver the multicast message to its intended recipients.

In test step 512 (FIG. 5), message sending logic 210 (FIG. 2) compares the relation measured in step 508 (FIG. 5) to a threshold. In one embodiment, the threshold is a constant, e.g., ten (10). In an alternative embodiment, the threshold is related to the number of interested ones of computers 102B–CC (FIG. 1) which are not reachable by a multicast message whose TTL parameter has the subject TTL parameter value. For example, the threshold can be ten percent (10%) of the number of interested computers not reachable by a multicast message whose TTL parameter has the subject TTL parameter value.

Comparison by message sending logic 210 (FIG. 2) of the measured relation to the threshold determines whether a sufficient portion of the burden imposed upon computer network 100 (FIG. 1) by a multicast message whose TTL parameter has the subject TTL parameter value is needed to deliver message 210 to intended recipients to justify the burden. If the measured relation is less than the threshold, the burden is so justified and processing transfers to step 514 (FIG. 5). Conversely, if the measured relation is not less than the threshold, the burden is not justified and processing transfers from test step 512 through next step 516 to loop step 504 and step 514 is skipped.

In step 514, message sending logic 210 (FIG. 2) updates the TTL record to store the subject TTL parameter, superseding the TTL parameter value previously stored in the TTL record. Accordingly, the TTL record stores the largest TTL parameter value for which the burden imposed upon computer network 100 (FIG. 1) is justified by the need to deliver message 214 (FIG. 2) to its intended recipients. Processing transfers through next step 516 (FIG. 5) to loop step 504.

In loop step 504, message sending logic 210 (FIG. 2) processes the next possible TTL parameter value according to steps 506–514 (FIG. 5). If all of the possible TTL parameter values have been processed according to the loop of steps 504–516, processing transfers to step 518.

In step 518, message sending logic 210 (FIG. 2) clips the TTL parameter value stored in the TTL record to the largest TTL distance of an interested computer reachable by a multicast message whose TTL parameter is the TTL parameter value stored in the TTL record. The following example is illustrative. Consider that a TTL parameter value of ten (10) is stored in the TTL record after the loop of steps 504–516 completes but that no interested computers have TTL distances of nine (9) or ten (10) but at least one interested computer has a TTL distance of eight (8) from computer 102A. By limiting the TTL parameter value of message 214 in the form of a multicast message to a value of eight (8) avoids unnecessarily burdening those of computers 102B–CC (FIG. 1) whose respective TTL distances from computer 102A are either nine (9) or ten (10) with the multicast message.

In step 520 (FIG. 5), message sending logic 210 (FIG. 2) sends message 214 as a multicast message whose TTL parameter has the TTL parameter value of the TTL record after clipping as described above with respect to step 518 (FIG. 5). In step 522, message sending logic 210 (FIG. 2) sends message 214 as a unicast message to each of the interested computers which are not reachable by the multicast message sent in step 520 (FIG. 5) if any such interested computers exist. After step 522, processing according to logic flow diagram 500 completes.

Thus, according to logic flow diagram 500, message sending logic 210 (FIG. 2) sends message 214 as a multicast message only if the burden imposed upon computer network 100 by such a multicast message is justified by the need to deliver message 214 to its intended recipients. As a result, a particularly efficient combination of multicast and unicast messages carry message 214 to all intended recipient computers whether near computer 102A or far from computer 102A.

The above description is illustrative only and is not limiting. The present invention is limited only by the claims which follow.

What is claimed is:

1. A computer system comprising:

a processor;

a memory operatively coupled to the processor; and a message sender which executes in the processor from the memory and which, when executed by the processor, causes the computer to send a message from a base node to at least two recipient nodes of a computer network, the message sender including:

a near selection module configured to select at least one near one of the recipient nodes;

a multicast sending module which is operatively coupled to the near selection module and which is configured to send the message as a multicast message to the near recipient nodes; and a unicast sending module which is operatively coupled to the near sending module and which is configured to send the message as a respective unicast message to each of at least one far ones of the recipient nodes which are different from the near recipient nodes.

2. The computer system of claim 1 wherein the near selection module comprises:

a gap measuring module which determines that at most a predetermined number of the far recipient nodes are at least a predetermined distance further from the base node that are the near recipient nodes.

3. The computer system of claim 1 wherein the near selection module comprises:

a comparison module which is configured to measure a relation between a number of nodes within a distance of the base node and a number of the recipient nodes within the distance of the base node; and a near node selection module which is operatively coupled to the comparison module and which is configured to select the recipient nodes within the distance of the base node as the near recipient nodes for a particular value of the distance for which the relation satisfies a condition.

4. The computer system of claim 3 wherein the condition is satisfied when a ratio of the number of nodes within the distance of the base node to the number of the recipient nodes within the distance of the base node is less than a threshold.

5. The computer system of claim 4 wherein the threshold is related to a number of recipient nodes beyond the distance from the base node.

6. The computer system of claim 5 wherein the threshold is proportional to a number of recipient nodes beyond the distance from the base node.

7. The computer system of claim 3 wherein the condition is satisfied when a difference between the number of nodes within the distance of the base node to the number of the recipient nodes within the distance of the base node is less than a threshold.

8. The computer system of claim 2 wherein the predetermined distance is proportional to a distance between the base node and a furthest of the near recipient nodes.

9. The computer system of claim 8 wherein the predetermined distance is equal to the distance between the base node and the furthest of the near recipient nodes.

10. The computer system of claim 2 wherein the multicast and unicast sending modules send the multicast and unicast messages, respectively, only upon a condition in which at most the predetermined number of far recipient nodes are at least the predetermined distance further from the base node that are the near recipient nodes.

11. The computer system of claim 2 wherein the near recipient nodes include all of the at least two recipient nodes other than the far recipient nodes.

12. The computer system of claim 2 wherein the predetermined number is ten.

13. A computer readable medium useful in association with a computer which includes a processor and a memory, the computer readable medium including computer instructions which are configured to cause the computer to send a message from a base node to at least two recipient nodes of a computer network, the computer instructions comprising:

a near selection module configured to select at least one near one of the recipient nodes;

a multicast sending module which is operatively coupled to the near selection module and which is configured to send the message as a multicast message to the near recipient nodes; and a unicast sending module which is operatively coupled to the near sending module and which is configured to send the message as a respective unicast message to each of at least one far one of the recipient nodes which are different from the near recipient nodes.

14. The computer readable medium of claim 13 wherein the near selection module comprises:
   a comparison module which is configured to measure a relation between a number of nodes within a distance of the base node and a number of the recipient nodes within the distance of the base node; and
   a near node selection module which is operatively coupled to the comparison module and which is configured to select the recipient nodes within the distance of the base node as the near recipient nodes for a particular value of the distance for which the relation satisfies a condition.

15. The computer readable medium of claim 14 wherein the condition is satisfied when a ratio of the number of nodes within the distance of the base node to the number of the recipient nodes within the distance of the base node is less than a threshold.

16. The computer readable medium of claim 15 wherein the threshold is related to a number of recipient nodes beyond the distance from the base node.

17. The computer readable medium of claim 16 wherein the threshold is proportional to a number of recipient nodes beyond the distance from the base node.

18. The computer readable medium of claim 14 wherein the condition is satisfied when a difference between the number of nodes within the distance of the base node to the number of the recipient nodes within the distance of the base node is less than a threshold.

19. The computer readable medium of claim 13 wherein the near selection module comprises:
   a gap measuring module which determines that at most a predetermined number of the far recipient nodes are at least a predetermined distance further from the base node that are the near recipient nodes.

20. The computer readable medium of claim 19 wherein the predetermined distance is proportional to a distance between the base node and a furthest of the near recipient nodes.

21. The computer readable medium of claim 20 wherein the predetermined distance is equal to the distance between the base node and the furthest of the near recipient nodes.

22. The computer readable medium of claim 19 wherein the multicast and unicast sending modules send the multicast and unicast messages, respectively, only upon a condition in which at most the predetermined number of far recipient nodes are at least the predetermined distance further from the base node that are the near recipient nodes.

23. The computer readable medium of claim 19 wherein the near recipient nodes include all of the at least two recipient nodes other than the far recipient nodes.

24. The computer readable medium of claim 19 wherein the predetermined number is ten.

25. A method for sending a message from a base node to at least two recipient nodes of a computer network, the method comprising:
   selecting at least one near one of the recipient nodes;
   sending the message as a multicast message to the near recipient nodes; and
   for each of at least one far one of the recipient nodes which is different from the near recipient nodes:
      sending the message to the far recipient node as a respective unicast message.

26. The method of claim 25 wherein selecting comprises:
   measuring a relation between a number of nodes within a distance of the base node and a number of the recipient nodes within the distance of the base node; and
   selecting the recipient nodes within the distance of the base node as the near recipient nodes for a particular value of the distance for which the relation satisfies a condition.

27. The method of claim 26 wherein the condition is satisfied when a ratio of the number of nodes within the distance of the base node to the number of the recipient nodes within the distance of the base node is less than a threshold.

28. The method of claim 27 wherein the threshold is related to a number of recipient nodes beyond the distance from the base node.

29. The method of claim 28 wherein the threshold is proportional to a number of recipient nodes beyond the distance from the base node.

30. The method of claim 26 wherein the condition is satisfied when a difference between the number of nodes within the distance of the base node to the number of the recipient nodes within the distance of the base node is less than a threshold.

31. The method of claim 25 wherein selecting comprises:
   determining that at most a predetermined number of the far recipient nodes are at least a predetermined distance further from the base node that are the near recipient nodes.

32. The method of claim 31 wherein the predetermined distance is proportional to a distance between the base node and a furthest of the near recipient nodes.

33. The method of claim 32 wherein the predetermined distance is equal to the distance between the base node and the furthest of the near recipient nodes.

34. The method of claim 31 wherein the sending of the multicast and unicast messages are performed only upon a condition in which at most the predetermined number of far recipient nodes are at least the predetermined distance further from the base node that are the near recipient nodes.

35. The method of claim 31 wherein the near recipient nodes include all of the at least two recipient nodes other than the far recipient nodes.

36. The method of claim 31 wherein the predetermined number is ten.

37. An apparatus for sending a message from a base node to at least two recipient nodes of a computer network, the apparatus comprising:
   means for selecting at least one near one of the recipient nodes;
   means for sending the message as a multicast message to the near recipient nodes; and
   means for sending the message as a respective unicast messages to each of at least one far one of the recipient nodes which are different from the near recipient nodes.

38. The apparatus of claim 37 wherein the means for selecting comprises:
   means for determining that at most a predetermined number of the far recipient nodes are at least a predetermined distance further from the base node that are the near recipient nodes.

39. The apparatus of claim 37 wherein the means for selecting comprises:
   means for measuring a relation between a number of nodes within a distance of the base node and a number of the recipient nodes within the distance of the base node; and
   means for selecting the recipient nodes within the distance of the base node as the near recipient nodes for a particular value of the distance for which the relation satisfies a condition.

* * * * *